June 2, 1953  R. A. GAISER  2,640,904

LAMINATED SAFETY GLASS

Filed Aug. 10, 1950

INVENTOR.
Romey A. Gaiser
BY Nobbe & Swope
ATTORNEYS

Patented June 2, 1953

2,640,904

UNITED STATES PATENT OFFICE 2,640,904

LAMINATED SAFETY GLASS

Romey A. Gaiser, Toledo, Ohio, assignor to Libbey-Owens-Ford Glass Company, Toledo, Ohio, a corporation of Ohio Application August 10, 1950, Serial No. 178,627

1 Claim. (Cl. 219—19)

The present invention relates to laminated safety glass, and more particularly to electrically conducting laminated safety glass.

Laminated safety glass, per se, is well known in the art and, generally speaking, comprises two or more sheets of glass and one or more interlayers of tough, flexible thermoplastic material all bonded together under the action of heat and pressure to produce a unitary composite structure.

Electrically conducting laminated safety glass is a relatively new development and is similar in construction to ordinary laminated safety glass except that one of the glass sheets has a transparent electrically conducting coating on an inner surface thereof. This electrically conducting coating may, for example, be a clear, transparent film of tin oxide as disclosed in the patent to Harold A. McMaster, No. 2,429,420, dated October 21, 1947, and in order to conduct electricity to and from the coating, electrodes are provided, usually along two opposite marginal portions of the coated glass sheet, and laminated into the unit.

To date such units have found their principal utility as de-icing windows or windshields in automobiles and aircraft. When an electric current is applied to the film it acts as a resistance heater and the glass becomes hot. By the application of sufficient electrical energy, properly controlled, the unit can be heated to a temperature at which ice or frost will be removed from, or its formation prevented on, the surface of the exposed glass sheet.

Now ordinary laminated glass, as produced by present day techniques, is a very stable article even under severe temperature conditions. However, electrically conducting laminated glass presents additional problems due to the fact that, in use, the temperatures at the various surfaces of the unit may be, and usually are, widely divergent. For example, when employed as a window or windshield in automobiles traveling in cold climates, or in airplanes at high altitudes, the glass and plastic surfaces adjoining the electrically conducting coating will be exposed to quite high temperatures, the surface of the unit facing the interior of the vehicle will be exposed to normal room temperatures, and the outside surface of the unit will be exposed to temperatures which may be far below zero.

Numerous failures of electrically conducting laminated safety glass have occurred in use. These generally take the form of electrode failure within the unit, usually accompanied by edge separation between the glass and plastic laminations. The cause of these failures has been attributed by other workers in the art to poor quality films, inferior electrodes, dirty glass and so forth, and much time has been spent in improving the quality of films, electrodes and glass, but the results of trials along these lines have been generally inconsistent, and have not solved the problem.

Now it is my opinion, proved by actual tests, that failures encountered in electrically conducting laminated safety glass are due primarily to bending of the unit due to the temperature differentials at the several surfaces and the difference in coefficient of expansion and contraction between the glass and the plastic interlayer, which act to set up bending forces in the unit, when the electrically conducting film is positioned in the manner heretofore considered most advantageous. Moreover, this condition is aggravated in aircraft by the fact that air pressure in the pressurized cabins tends to bend the glazing units outwardly, or in the same direction that electrically conducting, laminated safety glass units, of the type heretofore used, bend under heating loads.

However, I have now discovered that this objectionable bending under heating loads can be practically eliminated, or advantageously controlled, by positioning the electrically conducting film, or a plurality of such films, in a special location relative to the faces of the glass and plastic laminations and/or the outside faces of the unit.

Briefly stated, my invention is based on the discovery that bending of the electrically conducting laminated glass unit can be reduced, if not entirely overcome, (1) by placing an electrically conducting film on each of the glass faces that lie against the plastic interlayer, or (2) by locating the electrically conducting film approximately midway between the inner and outer surfaces of the unit, and also that the degree and direction of bending of the unit under heating loads can be controlled by proper positioning of the film or films in the unit.

It is therefore an aim of this invention to provide a special type of electrically conducting laminated safety glass, and a method of making such a unit, which will eliminate electrode failure and edge separation, from excessive bending of the unit, even under the most extreme temperature conditions.

Another object is to minimize and/or control bending of a unit of the above character under heating loads.

Other objects and advantages of the invention will become more apparent during the course of the following description, when taken in connection with the accompanying drawings.

In the drawings, wherein like numerals are employed to designate like parts throughout the same:

Figure 1:
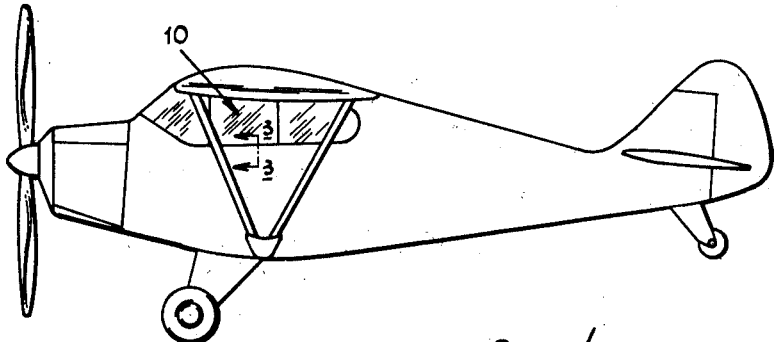
Fig. 1 is a side view of an airplane equipped with the special glazing units of this invention.
Figure 3:
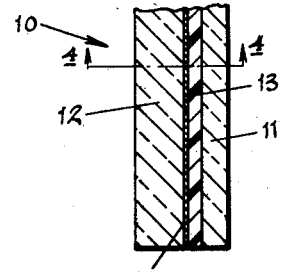
Fig. 3 is a sectional view through one form of the glazing unit of the invention taken substantially along the line 3—3 in Fig. 1.

Referring now more particularly to the drawings, the electrically conducting, laminated safety glass unit 10, illustrated in Figs. 1 and 3, is characteristic, except for the location of the electrically conducting film, of one type of previously known unit that has been used to glaze aircraft windows. As shown, this glazing unit is made up of two sheets of glass 11 and 12, which may be ordinary plate or sheet glass of any desired composition, and one or the other or both of which may be tempered or semi-tempered, and an interposed layer 13 of a tough flexible thermoplastic material, all bonded together under heat and pressure to provide a composite unitary structure.

Figure 2:
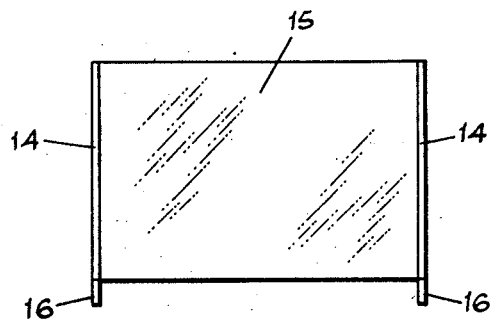
Fig. 2 is a face view of a glass sheet provided with electrodes and an electrically conducting coating on one face thereof, prior to assembling it with the other glass and plastic layers to form the unit of the invention.

In order to render this laminated safety glass unit electrically conducting, one of the glass plates, prior to laminating, is provided with suitable electrodes 14 (Fig. 2) along two opposite marginal portions of one surface thereof, and with an electrically conducting film 15 on this same surface.

A number of different materials may be used for the electrodes 14 and they may be applied to the glass in any convenient manner. For example, electrodes of sprayed copper, sprayed copper alloys, copper foil, silver and platinum fluxes and combinations of these materials have all been used with excellent results.

To date, the familiar silver bus bar material has been found to be as satisfactory as any and, according to one preferred method of applying the electrodes 14 and the electrically conducting film 15 to the glass sheet 11, the marginal portions of the sheet along its two short sides are first sprayed with an electrically conducting silver flux and then heated to fuse the flux onto the glass. The electrodes or bus bars thus formed may then be electroplated with copper, if necessary, to permit the soldering of suitable leads 16 thereto.

When the electrodes in place, the glass is then ready to be filmed and this can be done by first heating the sheet to approximately the softening point of the glass and then spraying the surface thereof with a solution of stannic tetrachloride to deposit a clear transparent electrically conducting layer of tin oxide 15 on the glass and in contact with the electrodes 14. If desired, the heating of the glass preparatory to filming can also be utilized to fuse the silver flux to the glass, thus eliminating one heating step.

The filmed glass sheet can then be incorporated into an integral composite unit by assembling it together with a second glass sheet and a plastic interlayer sheet to form a glass-plastic sandwich, with the coated surface inside, and then laminating the several layers of the sandwich together in accordance with any of the well known laminating procedures.

It will be noted in the unit 10, shown in Fig. 3, that the glass sheet 11 is considerably thinner than the glass sheet 12. Now, heretofore, in producing electrically conducting laminated safety glass for aircraft glazing units, it has been customary to place the electrically conducting film on the inner surface of the outboard light, and to make the outboard light as thin as possible in order to obtain the maximum defrosting action when electrical energy is applied to the film.

Consequently, with a structure such as shown in Fig. 3 it would, prior to my invention, have been the natural and accepted procedure to apply the tin oxide film 15 to a surface of the thinner sheet 11 and to then laminate the filmed sheet together with the interlayer 13 and another glass sheet 12, with the filmed surface against the interlayer 13.

However, as indicated above, I have discovered that the arrangement of the filmed surface in this way in the lamination is largely responsible for the difficulties encountered with electrode failure within such units and with edge separation between the glass and plastic laminations. More specifically, I have found that the previously accepted and approved electrically conducting film placement in laminated glazing units has resulted in the setting up of disruptive bending stresses, upon application of current to the film, that have caused a disconcerting number of failures of such glazing units in use.

Even prior to the proving of my theory, the potentially destructive nature of the bending forces that could be set up when a sheet of glass is heated on one side only, especially with the possibility of the plastic interlayer acting as a rigid member and bending from one surface heating, could be realized from the difference in the coefficient of expansion between the glass and plastic laminations.

Thus, the coefficient of linear expansion of the soda-lime-silica glass used by the assignee company in the manufacture of airplane glazing units is approximately $50 \times 10^{-7°}$ F., while, over the same temperature range, the plastic interlayer used has a coefficient of linear expansion of approximately $500 \times 10^{-7°}$ F. Or, simply expressed, the linear expansion of the plastic is approximately ten times greater than that of the glass.

For this reason, the extremely well bonded glass and plastic laminations, having such widely varying coefficients of linear expansion, is comparable to bimetallic thermostat construction, and a light of laminated glass 36 inches in length, going through a change of temperature from 120° F. to —65° F., has a contraction whereby the plastic wishes to be over ¼ inch shorter than the glass.

In order to prove my theory that bending of an electrically conducting laminated unit occurs when heat is applied to the unit through the electrically conducting film, and that this bending can be minimized, or accurately controlled, by proper placement of the electrically conducting film in the unit, a number of tests on various types of units were conducted.

For all of the tests, laminated units 32 inches long by 16½ inches wide were employed, and for the first tests the units were rigidly supported in a horizontal position at their centers, with deflection gauges at all four corners and at all edges equally spaced between the corners. The units were then placed in a cold room and cooled to −37° F., after which current was supplied to the electrically conducting film to raise the temperature at .020 inch from the film to 145° F.

When a unit such as is shown in Fig. 3, that is, in which one of the glass sheets is nearly equal in thickness to the combined thickness of the interlayer and the other glass sheet, but of prior art construction, in that the electrically conducting film is on the face of the thinner glass sheet adjacent the plastic interlayer, was tested in this manner, the sheet bent .169 of an inch.

However, when a unit of this same type, but made in accordance with my invention, that is, with the electrically conducting film on the inner surface of the thicker piece of glass as shown at 15 in Fig. 3, was tested, it bent only .068 of an inch.

In other words, the moving of the electrically conducting film nearer to the center of thickness of the unit reduced the bending of the unit under the heat load by considerably more than 50%.

Maximum deviation was obtained in these tests by increasing the heat until the average temperature of the plastic reached a value at which the interlayer 13 ceased to act as a rigid member, started to flow, and the stresses in the filmed glass exceeded those in the plastic. At this point the bending of the unit ceased to increase.

In order to further substantiate my theory that bending stresses are set up in electrically conducting laminated safety glass during heating of the electrically conducting film, and that the extent or severity of these bending stresses are dependent on the location of the film with respect to the other components of the lamination, additional tests were made on units having the film spaced at varying distances from the center of thickness of the unit.

The results of the tests on seven different laminated units are given in tabulated form below. This group of units is believed to give a representative picture of the tests because it will be noted that although the units involve various glass thicknesses and even some variation in plastic thickness, as well as different voltages and wattages of applied current, the variation in deflection, or amount of bending of each unit upon the application of heat load, is generally proportional to the distance of the heated film from the center of thickness of the unit.

| Glass Thickness Combination, Inches | Plastic Thickness | Ratio [1] | Wattage Applied | Maximum [2] Deflection in Inches | Voltage |
|---|---|---|---|---|---|
| 9/64–½ | .120 | 1:5.43 | 3520 | −.174 | 440 |
| 9/64–½ | .120 | 1:3.64 | 2464 | −.161 | 440 |
| 13/64–¼ | .120 | 1:2.82 | 3168 | −.152 | 440 |
| ⅜–½ | .120 | 1:2.65 | 3173 | −.100 | 369 |
| ½–⅜ | .120 | 1:1.99 | 3168 | −.038 | 440 |
| ⅜–7/64 | .060 | 1:1.61 | 2560 | +.102 | 320 |
| ½–7/64 | .120 | 1:1.46 | 3182 | +.108 | 309 |

[1] Ratio refers to the relation of the distance of film from the top surface of the glass to the over-all thickness of the unit.
[2] Minus deflections denote the corners of the unit bending downward and plus deflections denote the corners of the unit bending upward. All units supported at the center. All units have the filmed light as the uppermost pane in the lamination.

From the above it will be apparent, first, that the bending of electrically conducting laminated safety glass upon application of current to the electrically conducting film can be minimized by locating the electrically conducting film as close to the center of thickness of the units as possible. This can be done by selecting glass layers of such relative thickness that when they are assembled together with the plastic interlayers to provide a laminated glass unit, the surface of one of said glass sheets or layers will be nearer to the center of thickness of the unit than any other face of any of the other glass sheets, and then applying the electrically conducting film to this face that will be nearer to the center of thickness in the finished unit (as at 15 in Fig. 3).

It will also be apparent that the direction in which the laminated unit will bend under the heating load applied to the conducting film can be controlled by locating the film to one side or the other of the center of thickness of the unit. To illustrate, it will be noted that the first five units listed in the table above have minus deflections, that is the corners of these units (which were rigidly held at their centers) bent downwardly. On the other hand, the last two units listed have plus deflections, which means that the corners of these units bend upwardly under the heating load.

Now an examination of the relation of the distance of the electrically conducting film from the top surface of the glass in each of these units, to the over-all thickness of the unit, as shown in the column headed "ratio," will show that in all of the units where the film was above the center of thickness of the unit (first five), the units bent upwardly upon the application of current, while in all of the units where the film was below the center of thickness of the unit, the unit bent downwardly under the heating load.

Consequently, in order to insure a unit bending in a predetermined direction under heating load, it is only necessary to locate the electrically conducting film on the side of the center of thickness on which it is desired to have the unit bend. This can be done even when the bending stresses that are set up under the heating load are relatively slight (ratio of 1:1.99 to give a maximum deflection of .038 of an inch).

This phase of the invention has considerable potential value for use in pressurized cabins, where the pressure within the cabin which tends to bend the glass outwardly can be offset or compensated for in whole or in part by locating the electrically conducting film even a very slight distance inwardly of the center of thickness of the laminated glazing unit.

According to another phase of the invention, the tendency of electrically conducting, laminated safety glass units to bend under heating loads is minimized, if not actually eliminated, by providing the opposed surfaces of both of the glass sheets, lying at opposite sides of the plastic interlayer, with electrically conducting films, and applying heat to both films at substantially the same time.

Figure 5:
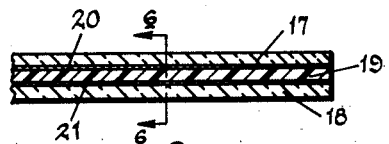
Fig. 5 is a view similar to Fig. 3, but showing a modified construction embodying the invention.
Figure 6:
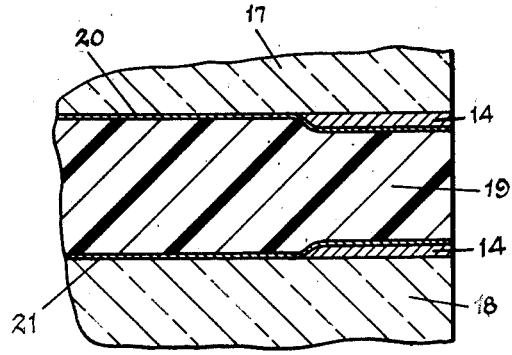
Fig. 6 is an enlarged, fragmentary, sectional view taken substantially on the line 6—6 in Fig. 5.
Figure 4:
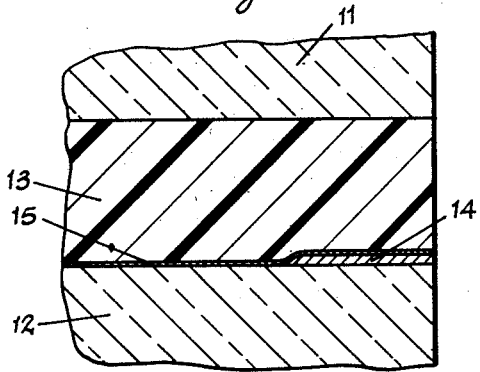
Fig. 4 is an enlarged, fragmentary, sectional view taken substantially on the line 4—4 in Fig. 3.

To illustrate, tests were performed on units of the type shown in Figs. 5 and 6, that is, in which the two outer glass layers 17 and 18, and the plastic interlayer 19, were all of substantially equal thickness. In producing these units for the tests, transparent, electrically conducting films of tin oxide 20 and 21 were formed on one face of each of the glass sheets 17 and 18, after which these sheets were assembled together with the plastic interlayer 19 and with the films 20 and 21 against opposite surfaces of the plastic interlayer, before uniting the glass-plastic sandwich into an integral, composite unit under heat and pressure.

The units were tested by first supplying electrical current to the film 20 alone and measuring the deflection or bending of the unit under the heat load; then supplying current to the film 21 alone and again measuring the bending or deflection of the unit; and finally by supplying current to both of the films 20 and 21 simultaneously and once more measuring the amount of bending or deflection.

In one representative test, in which glass and plastic layers of 1/8 inch thickness were used, and the unit first cooled to 6° F. and then heated to 140° within .020 of an inch from the heated film, the application of current to the film on one side of the plastic only resulted in a maximum deflection of +.063 of an inch; and the application of current only to the film on the opposite side of the plastic interlayer resulted in a maximum deflection of —.091 of an inch.

However, when current was supplied to the films on both sides of the interlayer at the same time, the maximum deflection was only .008 of an inch, or, in other words, when current was supplied to electrically conducting films on glass sheets at both sides of the plastic interlayer the degree of bending or deflection measured was from 87½ to 91% less than the degree of deflection of the same unit as measured when a film on one side of the plastic only was carrying a heating load.

My discoveries as to the bending of electrically conducting, laminated glass glazing units under heating loads, and as to the causes of such bending, lead to a rather revolutionary design of glazing units for aircraft.

Thus, it has heretofore been overwhelming practice to construct aircraft laminated glazing units with the inboard light the thickest pane in the unit. This inboard pane carries practically all the pressure load, while the outboard light, which has always heretofore been a thinner filmed light, bears little of the pressure load.

Now such a glazing unit in an aircraft window or windshield tends to bend outwardly from heat. From pressure it tends to bend outwardly also. Moreover, aircraft windows are now being built to withstand —65° F. temperatures and the trend is toward units which will withstand even lower temperatures. The plastic interlayer should be considered as a rigid member of the lamination at such temperatures and, if full power input is applied to a window of the prior known construction which has achieved such low temperatures, the thermal bending, plus the added pressure bending may easily exceed the limit of glass safety.

According to the present invention, however, electrically conducting, laminated safety glass aircraft windows can be re-designed in either one of two ways to avoid the potentially serious results of these extreme operating conditions. Thus, an electrically conducting film may be placed on both lights of glass, adjoining the plastic interlayer; or, bending may be both minimized and controlled by the use of a single electrically conducting film placed with the laminated glazing unit either at, or preferably over, 50% of the thickness distance, starting from the outboard air-glass interface.

Although this invention has been here described specifically in connection with a glazing unit having only two sheets of glass and one interposed layer of plastic material, it is equally applicable to glazing units having a greater number of layers of glass and/or plastic. In fact, it is to be understood that the forms of the invention heerwith shown and described are to be taken as illustrative embodiments only of the same, and that various changes in the shape, size and arrangement of parts, as well as various procedural changes may be resorted to without departing from the spirit of the invention or the scope of the subjoined claim.

I claim:

An electrically conducting laminated glass unit comprising alternate layers of glass and tough flexible thermoplastic material and having a face of one of said glass layers nearer to the center of thickness of the unit than any other face of any of the other of said glass layers, and a transparent electrically conducting film on said first-mentioned glass face, said film and said alternate layer of glass and tough flexible thermoplastic material, all being securely bonded together into a composite structure.

ROMEY A. GAISER.

References Cited in the file of this patent

UNITED STATES PATENTS

| Number | Name | Date |
| --- | --- | --- |
| 1,811,725 | Marckworth | June 23, 1931 |
| 1,980,970 | Monro | Nov. 13, 1934 |
| 1,981,703 | Monro | Nov. 20, 1934 |
| 2,068,082 | Sherts | Jan. 19, 1937 |
| 2,094,183 | Nobbe | Sept. 28, 1937 |
| 2,366,687 | Osterberg | Jan. 2, 1945 |
| 2,429,420 | McMaster | Oct. 21, 1947 |
| 2,475,379 | Stong | July 5, 1949 |
| 2,497,507 | McMaster | Feb. 14, 1950 |
| 2,507,036 | McCrumm et al. | May 9, 1950 |
| 2,513,993 | Burton | July 4, 1950 |
| 2,552,955 | Gaiser et al. | May 15, 1951 |
| 2,564,677 | Davis | Aug. 21, 1951 |
| 2,583,000 | Lytle | Jan. 22, 1952 |
| 2,592,601 | Raymond et al. | Apr. 15, 1952 |

FOREIGN PATENTS

| Number | Country | Date |
| --- | --- | --- |
| 909,962 | France | Jan. 14, 1946 |